3,304,084
RELEASABLE CONVEYOR
Harry M. Ashton, Birmingham, Mich., assignor to Ashton Automation International, Inc., Detroit, Mich., a corporation of Michigan
Filed June 4, 1965, Ser. No. 461,384
17 Claims. (Cl. 271—74)

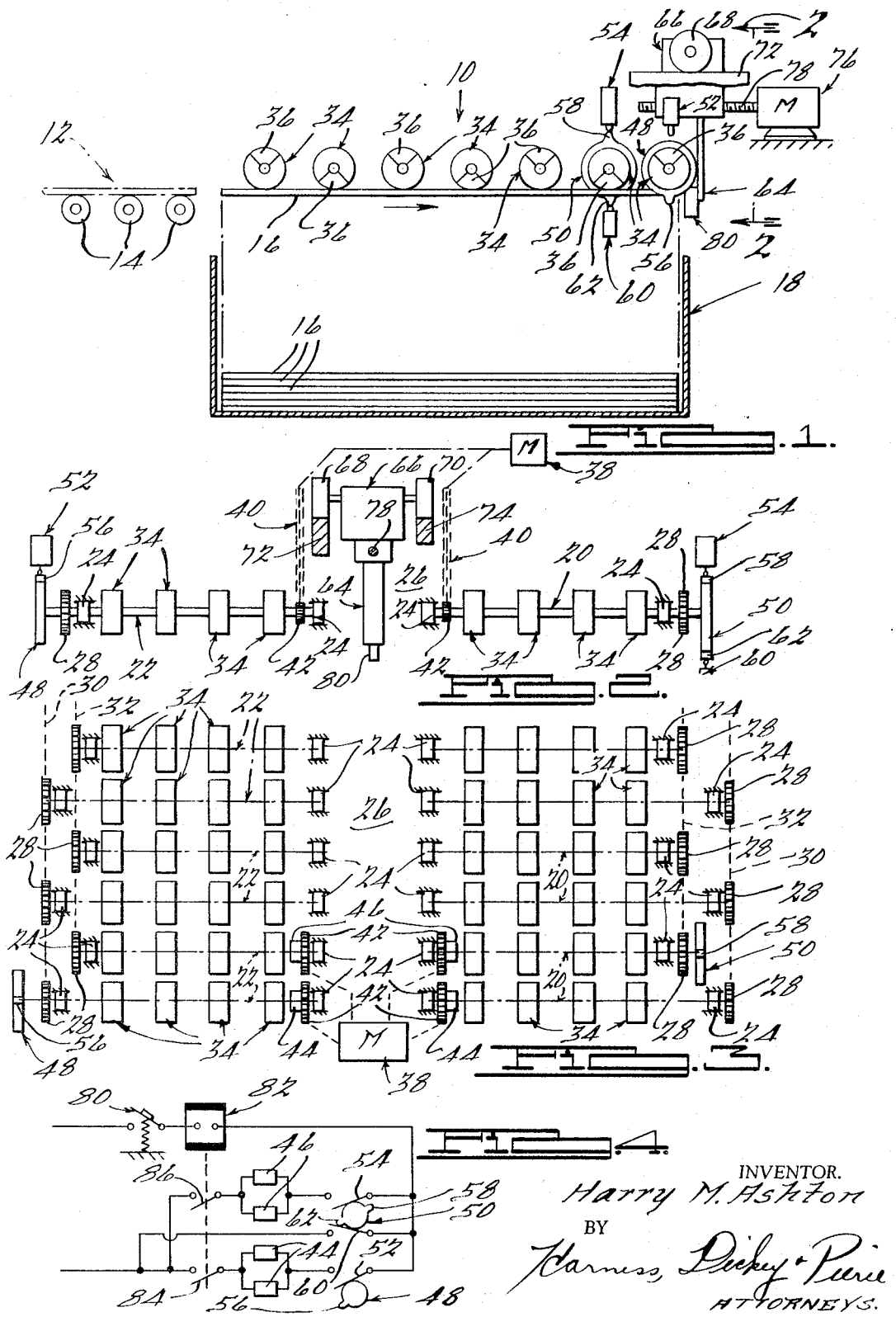

This invention relates generally to metal work stock conveying apparatus and, more particularly, to a new and improved apparatus for conveying and/or stacking successive metal sheets as they are delivered from a rolling mill, heat treating tank or other apparatus within which they have been treated.

It has heretofore frequently been the practice in handling metal sheets in a processing line or the like to provide the sheet conveying apparatus with various types of magnetic retaining means for detachably securing the successive metal sheets to the apparatus as they are traversed therealong. Such retaining means have been frequently in the form of electromagnetic rollers that are arranged longitudinally along the line of travel of the sheets and which, when energized, secure the successive metal sheets to the conveying apparatus until the sheets reach a predetermined location, at which time the sheets engage some form of position responsive or proximity switch means that functions to deenergize the rollers, resulting in the sheets dropping into a bin, tote box or similar receptacle located below the conveying apparatus. Occasionally, such retaining means have been in the form of permanent magnetic rollers, in which case the successive metal sheets have been removed from the rollers of the conveying apparatus by auxiliary stripping mechanisms that force the sheets off the rollers by any suitable hydraulic, pneumatic or mechanically actuated means. However, regardless of the particular type of magnetic securing or retaining means employed, such type conveying apparatus have been somewhat objectionable due to the relatively complex and expensive constructions thereof. In particular, the aforementioned electromagnetic rollers have been objectionable due to the necessity of providing various types of brushes, coils, commutators and similar components to communicate electric current to the rollers, which components have relatively high initial costs and require frequent maintenance and/or replacement. In a similar manner, permanent magnetic rollers have been objectionable due to the necessity of providing relatively expensive stripping apparatus, which apparatus in certain instances may in itself be objectionable due to the possibility of damaging the metal sheets as they are stripped from the conveyor.

Generally speaking, the present invention is directed toward a sheet metal conveying and/or stacking apparatus of the above character which is provided with a plurality of magnetic work stock conveying rollers along which successive metal sheets may be traversed or conveyed; however, the conveyor rollers incorporated in the apparatus of the present invention differ considerably from their analogous members of similar apparatus heretofore known and used in that each of the rollers is provided with a radial segment of a non-magnetic material. The rollers are operatively associated with a drive mechanism and control means that rotates the rollers in a preselected manner such that when the successive metal sheets have been conveyed to a predetermined longitudinal position, the rollers are rotated such that the non-magnetic segments thereof move into engagement with the sheets, resulting in the sheets being automatically released from the conveyor so that they may be stacked, conveyed to another work station or the like, as will later be described.

It is accordingly an object of the present invention to provide a new and improved sheet metal conveying and stacking apparatus of a simple and durable construction that will positively release successive metal sheets at a predetermined position along their longitudinal direction of movement without requiring any auxiliary stripping apparatus.

It is another object of the present invention to provide a new and improved sheet metal conveying and stacking apparatus of the above character that will rapidly deliver and evenly pile successive metal sheets without scratching their surfaces or otherwise damaging the same.

It is still another object of the present invention to provide a new and improved apparatus of the above character wherein the plurality of rollers are supported and arranged such that rotary movement may be simultaneously imparted to all of the rollers by a single drive motor.

It is yet another object of the present invention to provide a new and improved apparatus that may be easily adjusted to accommodate metal sheets of various sizes and is thus characterized by universality of installation.

It is a further object of the present invention to provide a new and improved sheet metal conveying and stacking apparatus of the above character which is relatively easy to assemble and economical to commercially manufacture.

Other objects and advantages of the present invention will become apparent from the following detailed description taken in conjunction with the accompanying drawing, wherein:

FIGURE 1 is a side elevational view, partially schematic of an exemplary embodiment of the sheet metal conveying and stacking apparatus of the present invention;

FIGURE 2 is a transverse cross-sectional view, partially schematic, of the apparatus illustrated in FIGURE 1, as seen substantially along the line 2—2 thereof;

FIGURE 3 is a top elevational view, partially schematic, of a portion of the conveying and stacking apparatus illustrated in FIGURE 1; and FIGURE 4 is a schematic representation of the electrical circuit incorporated in the conveying apparatus of the present invention.

Referring now to FIGURE 1 of the drawing, a sheet metal conveying and stacking apparatus, generally designated 10 and constructed in accordance with an exemplary embodiment of the present invention, is shown in operative association with a conveyor or process line 12 of conventional design and comprising a plurality of longitudinally spaced rollers 14 upon which successive metal sheets, generally designated 16, are singularly delivered to the apparatus 10 from a rolling mill, heat treating tank or other apparatus within which they have been treated. In the exemplary embodiment described herein, the apparatus 10 functions to convey the successive metal sheets 16 to a preselected longitudinal position which is located directly above an open ended bin, tote box or the like, generally designated 18, that is disposed below the apparatus 10, at which time the metal sheets 16 are released from the apparatus 10 to successively drop downwardly into the bin 18 where they are stacked in vertically aligned column form, in a manner later to be described.

Referring now in detail to the construction of the present invention, as best seen in FIGURES 2 and 3, the apparatus 10 comprises a plurality of horizontally extending, longitudinally spaced parallel and coplanar arranged roller carrying shaft members which are disposed in right and left banks, the shaft members in the right bank being generally designated by the numeral 20 and the shaft members in the left bank being generally designated by the numeral 22. As seen in FIGURE 3, the shafts 20, 22 are rotatably supported by a plurality of fixedly mounted journal housings, generally designated 24, in a manner such that the shafts 20 in the right bank are axially aligned with the shafts 22 of the left bank, whereby to provide successive rows of longitudinally spaced and axially aligned shafts. The journal housings 24 supporting the inboard ends of the shafts 20 and 22 are longitudinally aligned and define a longitudinally extending central passageway or channel 26 between the right and left banks; however, due to the fact that the odd numbered shafts 20 and 22 (as numbered from the bottom up in FIGURE 3) are somewhat longer than the even numbered shafts 20, 22, the journal housings 24 supporting the outboard ends of the shafts 20 and 22 are staggered or offset, the housings 24 on the odd numbered shafts being located outboard of the housings 24 supporting the outer ends of the even numbered shafts 20 and 22.

The outboard end of each of the shafts 20 and 22 is provided with a sprocket member 28 of conventional design, which sprocket members 28 on all of the odd numbered shafts 20 and 22 are longitudinally aligned and on all of the even numbered shafts 20 and 22 are longitudinally aligned. A plurality of drive chains that may be of any conventional design corresponding to the construction of the sprocket members 28 and which are schematically indicated in FIGURE 3 by the dotted lines 30, are mounted on the sprocket members 28 of the odd numbered shafts 20, 22 in the usual manner, whereby rotation of any particular one of the odd numbered shafts 20 or 22 will cause all of the odd numbered shafts 20 and 22 to rotate. Accordingly, all of the odd numbered shafts 20 and 22 will rotate concurrently at the same speed and in the same direction. In a similar manner, a plurality of drive chains which are indicated schematically and designated by the numeral 32 are mounted on the sprocket members 28 of the even numbered shafts 20, 22 whereby all of these shafts will rotate concurrently at the same speed and in the same direction. It will be seen, therefore, that the alternate axially aligned pairs or rows of shafts 20 and 22 may rotate independently of each other, as will later be described.

In accordance with the principles of the present invention, each of these shafts 20 and 22 is provided with a plurality of transversely spaced sheet metal carrying rollers, generally designated 34, each of which, with the exception of a radial segment best seen in FIGURE 1 and designated by the numeral 36, is constructed of a magnetic material that is of sufficient magnetic strength so that the rollers 34 are capable of supporting successive metal sheets 16 in the manner illustrated in FIGURE 1 as they are delivered from the processing line 12. The radial segments 36 of each of the rollers 34 is constructed of a non-magnetic material such that when the segment 36 of a particular roller 34 is in peripheral contact with one of the metal sheets 16, there is no magnetic force exerted on the sheet by the roller 34. Hence, when all of the rollers 34 are oriented such that the non-magnetic segments 36 thereof are disposed out of peripheral engagement with the sheets 16, the sheets will be positively secured to the rollers 34 in a manner well known in the art. At such time, however, as the rollers 34 are oriented so that the non-magnetic segments 36 thereof are in contact with the sheets 16, the sheets will be released from the rollers 34.

As illustrated in FIGURE 1, the rollers 34 are mounted on the shafts 20 and 22 in a manner such that the non-magnetic segments 36 thereof on the odd numbered pairs of axially aligned shafts 20, 22 are offset approximately 180° from the non-magnetic segments 36 of the rollers 34 on the even numbered pairs of shafts 20, 22. Accordingly, when the segments 36 of the rollers 34 on the odd numbered rows of shafts 20 and 22 are directed downward and are in contact with one of the metal sheets 16, the segments 36 of the rollers 34 on the even numbered rows of shafts 20 and 22 are directed upwardly and are out of contact with the metal sheets 16. In a preferred construction of the present invention, the non-magnetic segments 34 have an arc length of approximately 90°. Also, the rollers 34 are preferably of sufficient magnetic strength to support one of the sheets 16 when only half of the rollers 34 have their non-magnetic segments 36 in contact with the sheet 16.

Means for concurrently rotating the shafts 20 and 22, and hence rotating the plurality of rollers 34 which are secured thereto, is provided by a drive motor 38 that is schematically shown in FIGURES 2 and 3. The motor 38 is adapted to transmit rotary power to the plurality of shafts 20 and 22 by means of four conventional drive chains, two of which are shown schematically in FIGURE 2 and generally designated by the numeral 40, the drive chains 40 being rotatably mounted in the usual manner on four sprocket members 42 that are disposed one on the inboard end of each of the two forwardmost (lowermost in FIGURE 3) shafts 20 and 22, which shafts 20 and 22 thereby become drive or jack shafts for imparting rotary movement to the rest of the shafts 20 and 22. More particularly, rotation of the lowermost row of aligned shafts 20 and 22 upon energization of the motor 38 will drive all of the odd numbered shafts 20 and 22 through the drive chains 30. Similarly, rotation of the next to the lowermost row of aligned shafts 20 and 22 will effect rotation of all of the even numbered shafts 20 and 22 through the drive chain 32. It will be seen, therefore, that upon energization of the drive motor 38, all of the shafts 20 and 22, together with the plurality of rollers 34 secured thereto, will be rotated concurrently at the same speed and in the same direction (counterclockwise in FIGURE 1).

The sprocket members 42 associated with the lowermost row of aligned shafts 20 and 22 are connected to these shafts by means of a pair of electrically energized or electromagnetic braking and clutching mechanisms 44 which are located directly outboard of the aforesaid sprocket members, as seen in FIGURE 3. Similarly, the sprocket members 42 which are associated with the next to the lowermost row of shafts 20 and 22 are secured to these shafts by means of another pair of electrically energized or electromagnetic braking and clutching mechanisms 46 which are also located directly outboard of their associated sprocket members 42. The construction and operation of the mechanisms 44 and 46 is well known in the art and requires no description other than that upon preselected energization thereof, the clutching systems disengage the sprocket members 42 from their respective shafts 20, 22 and the braking systems are actuated to stop rotational movement of the aforesaid drive shafts which, of course, results in stopping rotational movement of all of the shafts 20, 22 along with the plurality of rollers 34 mounted thereon, as will hereinafter be described.

Means for selectively controlling energization and deenergization of the clutching and braking mechanisms 44 and 46 is provided by a pair of eccentric cam members 48 and 50 that cooperate with and are adapted to engage and actuate a pair of conventional limit switches 52 and 54, respectively, that are located at the outboard sides of the apparatus 10. As best seen in FIGURES 1 and 3, the cam member 48 is mounted on the extreme outboard end of the lowermost shaft 22 with its eccentric or lobe portion 56 radially offset 180° from the non-magnetic segments 36 of all of the rollers 34 on the odd numbered rows of shafts 20 and 22. Similarly, the cam member 50 is mounted on the outboard end of the next to the lowermost shaft 20 with its eccentric or lobe portion 58 offset 180° from the non-magnetic segments 36 of all of the rollers 34 on the even numbered rows of shafts 20 and 22. The limit switches 52 and 54 are disposed directly above the cam members 48 and 50, respectively in a manner such that each time the cam members 48, 50 rotate, the eccentric portions 56 and 58 thereof engage and actuate the switches 52 and 54, respectively, as will be apparent. A positioning switch 60, which is schematically shown in FIGURES 2 and 4, is provided below the cam member 50 and is adapted to be engaged and actuated by a second eccentric or lobe portion 62 formed on the member 50, which eccentric portion 62 is offset 180° from the aforementioned portion 58. The switch 60 functions to reposition the alternate rows of shafts 20 and 22 subsequent to each metal sheet 16 being deposited into the bin 18, as will later be described.

An adjustably mounted stop member or plate 64 depends downwardly within the central channel 26 and functions to limit the forward or longitudinal movement of the successive metal sheets 16 as they are conveyed along the apparatus 10, the lower end of the plate 64 projecting just below the rollers 34 so that the leading edges of the sheets 16 will engage therewith. The stop plate 64 is mounted on a longitudinally slidable trolley or carriage 66 which includes rollers 68 and 70 that are rotatably mounted on the opposite sides of the carriage 66 and ride upon a pair of spaced parallel ways or tracks 72 and 74, respectively. The stop plate 64 and carriage 66 are adapted to be moved to a preselected longitudinal position by actuation of an adjustment motor, schematically illustrated in FIGURE 1 and designated by the numeral 76. The motor 76 is provided with a conventional screw drive 78 (see FIGURE 1) that threadably engages the carriage 66 in a conventional manner such that appropriate actuation of the motor 76 will move the carriage 66 and stop plate 64 mounted thereon longitudinally within the channel 26. In the embodiment described herein, the stop plate 64 is adjusted so as to be substantially vertically aligned with the rear or back side of the bin 18 so that forward movement of the successive metal sheets 16 will terminate as the leading edges thereof reach the rear side of the bin 18. It will be apparent, of course, that the stop plate 64 may be longitudinally adjusted whereby to accommodate metal sheets of different sizes and/or bins or similar sheet receptacles of various configurations.

Mounted on the lower end of the stop plate 64 is a proximity switch 80 of conventional design against which the leading edges of the successive metal sheets 16 abut and actuate to effect release of the sheets 16 from the apparatus 10, as will hereinafter be described.

To facilitate correlating the various component members of the sheet metal conveying and stacking apparatus 10 of the present invention, a brief description of an exemplary operational cycle thereof will now be given with particular reference being made to the schematic wiring diagram illustrated in FIGURE 4.

In operation, assuming that the stop plate 64 is properly adjusted and that the drive motor 38 is energized causing the rollers 34 to rotate in a counterclockwise direction in FIGURE 1, the metal sheets 16, which are delivered singularly from the process line 12 or any suitable apparatus, conveyed along the plurality of rollers 34 in the conventional manner, the sheets 16 being held elevated against the rollers 34 without any underlying support. Each individual sheet 16 continues to advance in the direction of the arrow in FIGURE 1 until the leading edge thereof engages the proximity switch 80, at which time the switch 80 is actuated and forward movement of the sheet 16 is terminated. Upon actuation of the switch 80, a relay 82 that is schematically illustrated in FIGURE 4 closes a pair of contacts 84 and 86, also shown in FIGURE 4, to complete a portion of the electrical circuit to the clutching and braking mechanisms 44 and 46 which, as illustrated in FIGURE 4, are connected such that the mechanisms 44 on the lowermost row of shafts 20, 22 are in parallel with each other and the mechanisms 46 on the next to the lowermost row of shafts 20, 22 are in parallel with each other. It will be noted that the rollers 34 and cam members 48 and 50 will continue to rotate even though forward movement of the sheet 16 has stopped.

Assuming that the cam members 48 and 50 are disposed in the respective positions illustrated in FIGURE 4 and that the members 48 and 50 are rotating in a counterclockwise direction, the eccentric portion 58 of the cam member 50 will momentarily engage and actuate the limit switch 54, thereby completing the circuit to the clutching and braking mechanisms 46 which cause the even numbered shafts 20, 22 and rollers 34 mounted thereon to stop rotating at the exact time the non-magnetic segments 36 thereof are in peripheral contact with the metal sheet 16. Simultaneously, the eccentric portion 62 of the cam member 50 engages and actuates the positioning switch 60. The odd numbered shafts 20, 22 and associated rollers 34 will continue to rotate for another 180°, at which time the eccentric portion 56 of the cam member 48 will engage and actuate the limit switch 52, thereby completing the circuit to the clutching and barking mechanisms 44 which cause the odd numbered shafts 20, 22 and associated rollers 34 to stop rotating at the exact time the non-magnetic segments 36 of these rollers 34 are in contact with the metal sheet 16, at which time it will be seen that all of the non-magnetic segments 36 will be in contact with the sheet 16, thereby releasing it to drop downwardly into the bin 18 to complete the stacking portion of the operational cycle.

As the metal sheet 16 drops downwardly into the bin 18, the leading edge thereof disengages the proximity switch 80, thereby actuating the relay 82 and causing the contacts 84 and 86 to open. As the contact 86 is thus opened, the circuit to the clutching and braking mechanisms 46 is opened to de-energize the mechanisms 46, whereby the braking systems will be de-actuated and the clutching systems will be actuated so that rotary power will be transmitted from the sprocket members 42 to the even numbered rows of shafts 20, 22. The circuit to the clutching and braking mechanisms 44 will remain closed even though the contact 84 is open due to the fact that the positioning switch 60 is closed. At such time as the cam member 50 has rotated 180°, the eccentric portion 62 thereof will engage and actuate the positioning switch 60, thereby opening the circuit to the clutching and braking mechanisms 44 to effect de-energization thereof, at which time rotary power will be transmitted from the sprocket members 42 to the odd numbered rows of shafts 20, 22. It will be seen that the odd numbered rows of shafts 20, 22 and rollers 34 thereon will not begin to rotate until the even numbered shafts 20, 22 and rollers 34 secured thereto have rotated 180° so that the non-magnetic segments 36 of the rollers 34 of the even numbered shafts 20, 22 will be offset 180° from the non-magnetic segments 36 of the rollers 34 secured to the even numbered shafts 20, 22. At this time the apparatus 10 is conditioned for its next operational cycle, as hereinabove described.

Although particular reference has been made herein to use of the apparatus 10 of the present invention as applied to means for conveying successive metal sheets 16 to a preselected position where they may be dropped downwardly into the bin 18, it will be noted that the principles of the present invention are not intended to be limited to this sole application, and it will be apparent that the hereinabove described apparatus 10 is equally adapted for use for transporting work stock other than metal sheets such as billets and the like. Furthermore, the apparatus 10 of the present invention is readily adapted to convey successive metal sheets and the like between two or more different work stations, or between various associated conveying apparatus, instead of to a stacking receptacle such as the bin 18. Accordingly, it is to be understood that the claims appended hereto which are not specifically limited to a sheet metal stacking apparatus are to be construed as including such applications as are exemplified above.

While it will be apparent that the exemplary embodiment herein illustrated is well calculated to fulfill the objects above stated, it will be appreciated that the conveying and stacking apparatus 10 of the present invention is susceptible to modification, variation and change without departing from the proper scope or fair meaning of the subjoined claims.

What is claimed is:

1. In an apparatus for conveying para-magnetic materials, a plurality of rotatable members, at least some of said members being provided with magnetic segments for securing materials thereto and with non-magnetic segments for facilitating release of the materials therefrom, and means for selectively preventing rotational movement of a predetermined number of said members provided with said segments when said non-magnetic segments thereof are in contact with the material.

2. In an apparatus for conveying para-magnetic materials, a plurality of rollers, at least some of said rollers being provided with magnetic segments for securing materials thereto and with non-magnetic segments for facilitating release of the materials therefrom, and means responsive to rotational movement of said rollers for selectively preventing rotational movement of a predetermined number of said rollers provided with said segments when said non-magnetic segments thereof are in contact with the materials.

3. In an apparatus for conveying metallic work stock, a plurality of shafts, a plurality of rollers disposed on each of said shafts, at least some of said rollers being provided with magnetic segments for securing work stock to said shafts and with non-magnetic segments for facilitating release of the work stock from said shafts, and means responsive to rotational movement of said shafts for preventing rotational movement of a predetermined number of said shafts when said rollers provided with said segments have their non-magnetic segments in contact with the work stock.

4. An apparatus for conveying flat metallic work stock, a plurality of shafts, each of said shafts having a plurality of roller members secured thereto, each of said roller members having magnetic and non-magnetic segments, the non-magnetic segments of all of said rollers on each of said shafts being substantially radially aligned, drive means for rotating said shafts, and means for selectively preventing rotational movement of said shafts when the non-magnetic segments of said rollers are disposed at a predetermined rotational position.

5. The invention as set forth in claim 4 wherein the non-magnetic segments of the rollers on some of said shafts are radially offset from the non-magnetic segments of the rollers on other of said shafts.

6. In an apparatus for conveying flat metallic work stock, a plurality of elongated shafts, each of said shafts having a plurality of roller members secured thereto, at least some of said roller members having magnetic and non-magnetic segments, the non-magnetic segments of all of said rollers on the even number shafts being radially aligned and the non-magnetic segments of all of said rollers on the odd number shafts being radially aligned, and control means for selectively preventing rotational movement of said shafts when the non-magnetic segments of said rollers on said even and odd numbered shafts are arranged in a predetermined rotational position.

7. The invention as set forth in claim 6 wherein said control means comprises means responsive to the rotational position of said even and odd numbered shafts.

8. The invention as set forth in claim 6 which includes a drive motor for rotating said shafts and wherein said control means comprises braking means and means responsive to rotational movement of said shafts for energizing said braking means.

9. The invention as set forth in claim 8 wherein said means responsive to the rotational position of said shafts comprises cam means mounted on at least one of said even and odd numbered shafts.

10. In an apparatus for conveying flat metallic work stock, a plurality of spaced parallel shafts, each of said shafts having a plurality of roller members secured thereto, each of said roller members having magnetic and non-magnetic segments, the non-magnetic segments of all of the rollers on each of said shafts being radially aligned, the non-magnetic segments of all of said rollers on the even numbered shafts being radially aligned and the non-magnetic segments of all of said rollers on the odd numbered shafts being radially aligned, a drive motor for concomitantly rotating said shafts, means for transmitting rotary power from said motor to said shafts, means including braking means for independently stopping rotational movement of said even and odd numbered shafts, and means including control means for energizing said braking means.

11. The invention as set forth in claim 10 wherein said control means comprises means responsive to the rotational position of said even and odd numbered shafts.

12. The invention as set forth in claim 10 which includes switch means responsive to the position of the work stock supported on said rollers for energizing said control means.

13. The invention as set forth in claim 10 wherein said control means comprises cam means mounted on at least one of said even numbered and odd numbered shafts and means responsive to the rotational movement of said cam means for selectively energizing and de-energizing said braking means.

14. In an apparatus for conveying flat metallic work stock, a plurality of elongated spaced parallel and substantially coplanar arranged shafts, each of said shafts having a plurality of roller members secured thereto, each of said roller members having magnetic and non-magnetic segments, the non-magnetic segments of all of the rollers on each of said shafts being radially aligned, the non-magnetic segments of all of said rollers on the even numbered shafts being radially aligned and the non-magnetic segments of all of said rollers on the odd numbered shafts being radially aligned, a drive motor for concomitantly rotating each of said shafts, means for transmitting rotary power from said motor to said shafts, means including electrically energized braking means for independently and concurrently stopping rotational movement of the even and odd numbered shafts, first switch means for selectively energizing and de-energizing said braking means adapted to concurrently stop rotational movement of the even numbered shafts, second switch means for selectively energizing and de-energizing said braking means adapted to concurrently stop rotational movement of the odd numbered shafts, a first cam member mounted on one of the even numbered shafts and adapted to actuate said first switch means, a second cam member mounted on one of the odd numbered shafts and adapted to actuate said second switch means, said first and second switch means and said said first and second cam members being radially arranged such that said braking means for stopping rotational movement of the even and odd numbered shafts are energized when said non-magnetic segments of all of said rollers are radially aligned.

15. The invention as set forth in claim 14 wherein the non-magnetic segments of all of said rollers on the even numbered shafts are radially offset approximately 180° from the non-magnetic segments of all of said rollers on the odd numbered shafts.

16. The invention as set forth in claim 15 which includes switch means engageable by the metallic work stock supported on said rollers and adapted to energize the circuit communicating electric current to said braking means.

17. The invention as set forth in claim 16 which includes a work stock engaging stop member that is movable transversely of said shafts and is adapted to be adjustably mounted so as to limit movement of the work stock along the apparatus to a predetermined amount.

References Cited by the Examiner
UNITED STATES PATENTS

| | | | |
|---|---|---|---|
| 2,183,798 | 12/1939 | Theiss | 271—74.1 X |
| 2,642,174 | 6/1953 | Buccicone | 198—41 |
| 2,805,856 | 9/1957 | Stachbery | 271—74.1 X |
| 2,915,973 | 12/1959 | Findlay | 198—41 X |
| 2,939,568 | 6/1960 | Israelson et al. | 198—41 X |
| 2,947,429 | 8/1960 | Buccicone | 271—74.1 X |
| 3,144,927 | 8/1964 | Buccicone | 271—74.1 X |

EVON C. BLUNK, *Primary Examiner.*

A. C. HODGSON, *Assistant Examiner.*